Aug. 26, 1969 D. M. SMITH ET AL 3,463,398
MATERIAL SPREADER DEVICE FOR HELICOPTERS
Original Filed April 21, 1967 4 Sheets-Sheet 1
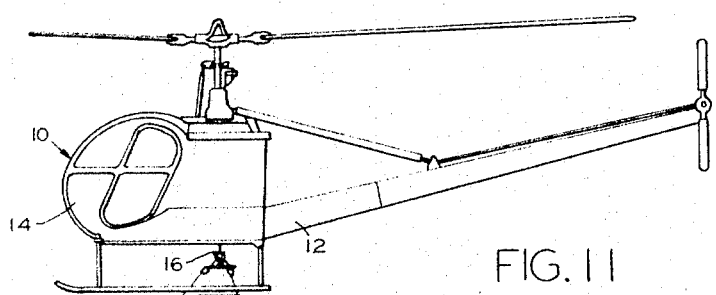
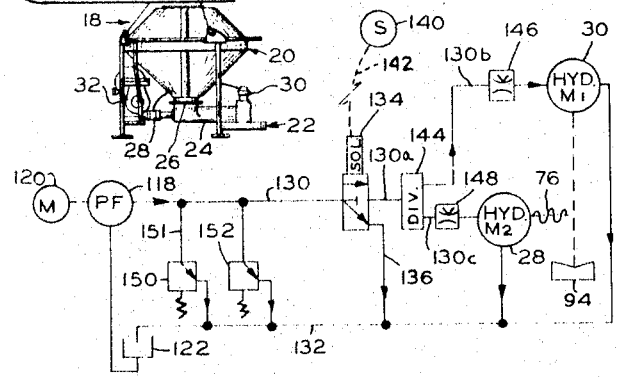
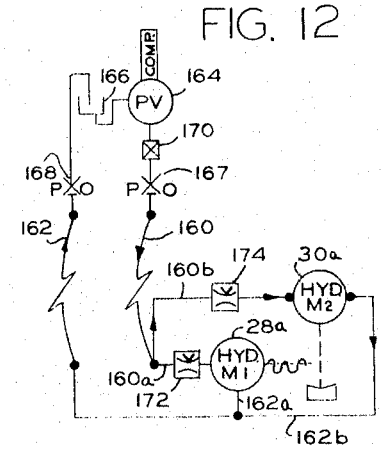
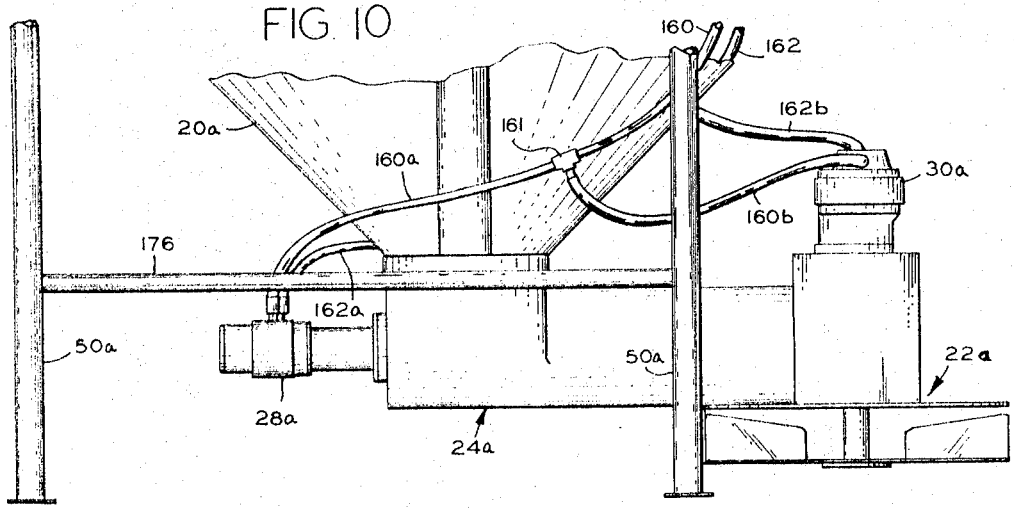
WARD EASON
DELFORD M. SMITH
INVENTORS
BY
BUCKHORN, BLORE, KLARQUIST & SPARKMAN
ATTORNEYS

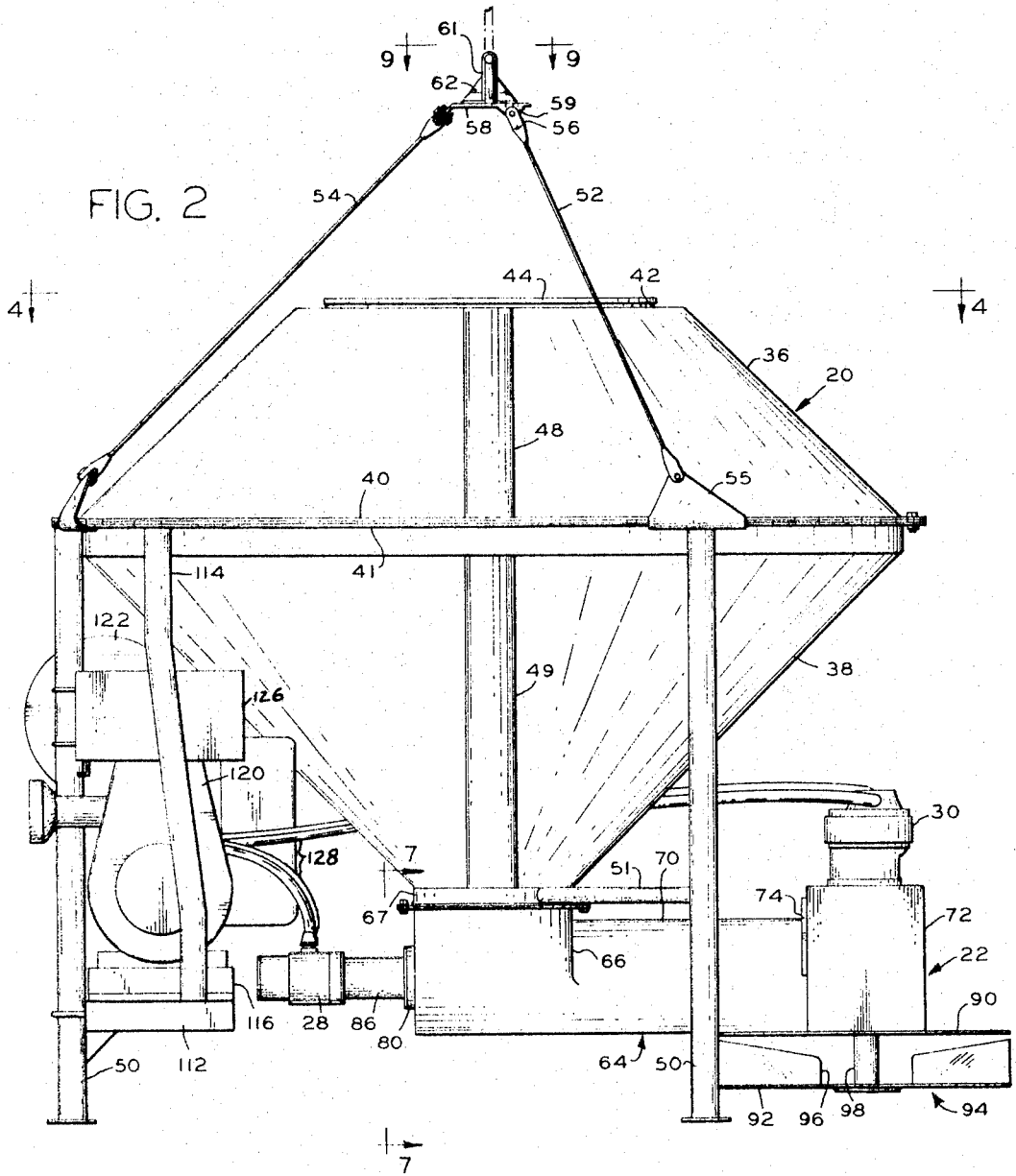

Aug. 26, 1969  D. M. SMITH ET AL  3,463,398
MATERIAL SPREADER DEVICE FOR HELICOPTERS
Original Filed April 21, 1967  4 Sheets-Sheet 3
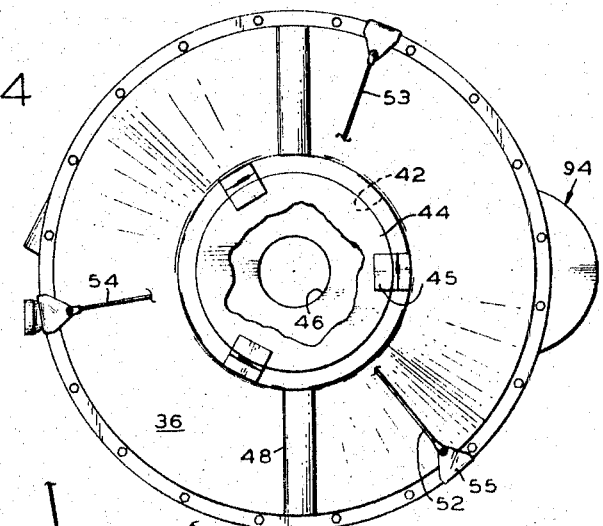
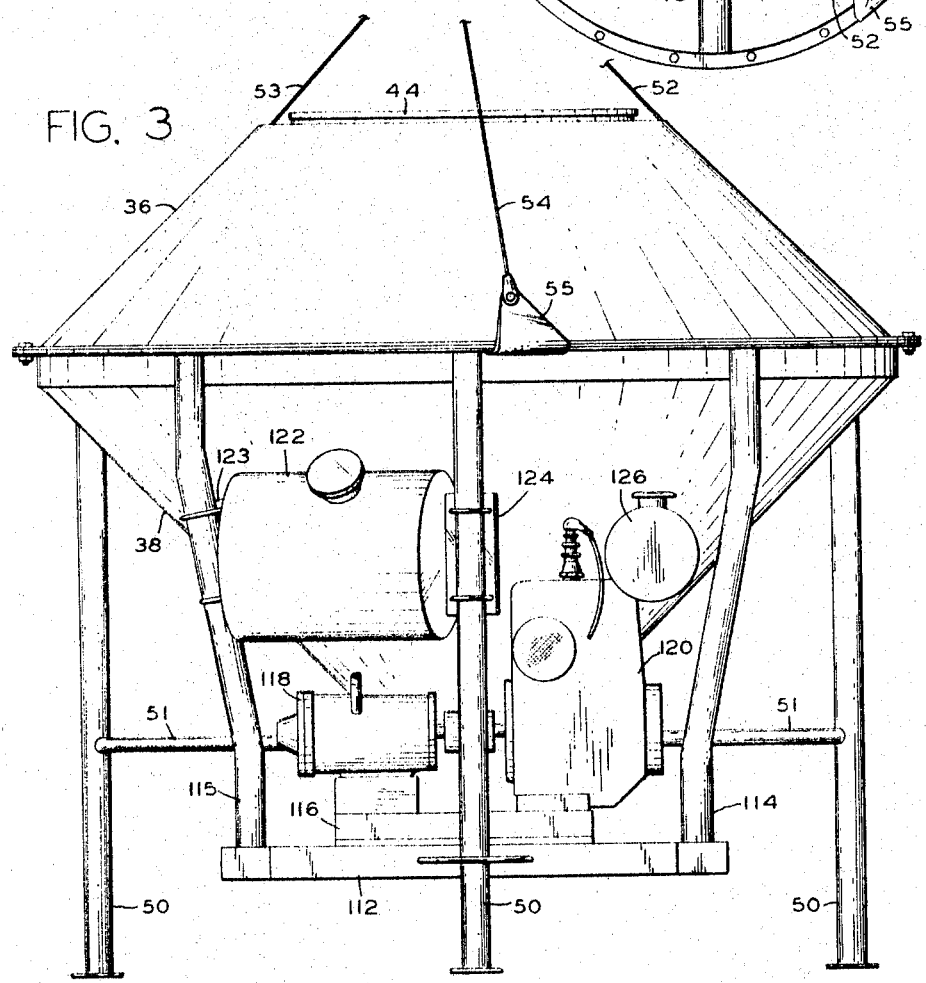
WARD EASON
DELFORD M. SMITH
INVENTORS
BY
BUCKHORN, BLORE, KLARQUIST & SPARKMAN
ATTORNEYS Aug. 26, 1969    D. M. SMITH ET AL    3,463,398
MATERIAL SPREADER DEVICE FOR HELICOPTERS Original Filed April 21, 1967    4 Sheets-Sheet 4

WARD EASON
DELFORD M. SMITH
INVENTORS

BY
BUCKHORN, BLORE, KLARQUIST & SPARKMAN
ATTORNEYS

United States Patent Office 3,463,398
Patented Aug. 26, 1969

3,463,398
MATERIAL SPREADER DEVICE FOR HELICOPTERS
Delford M. Smith and Ward Eason, McMinnville, Oreg., assignors to Evergreen Helicopters, Inc., McMinnville, Oreg., a corporation of Oregon
Continuation of application Ser. No. 632,696, Apr. 21, 1967. This application Nov. 21, 1968, Ser. No. 785,434
Int. Cl. B64d 1/18; B05b 17/02; A01c 19/00
U.S. Cl. 239—171                                           17 Claims

ABSTRACT OF THE DISCLOSURE

This specification discloses a granular material spreading apparatus for helicopters which includes as its central component a single material supply tank which is suspended by a three-cable sling from the depending cargo hook on the underside of a helicopter. The sling can be readily released from the cargo hook with the tank either suspended in flight or supported on the ground. Legs attached to the tank support it in an upright position when resting on the ground surface. The tank has a top filler opening and a bottom opening through which granular material flows by gravity directly into the forward end of an auger housing fixed to the bottom of the tank. The auger housing extends rearwardly from the bottom tank opening to a slinger device, and an auger within the housing feeds material from beneath the tank opening into the slinger, with the rate of feed being determined by the speed of rotation of the auger. The auger and slinger are independently driven by separate hydraulic powered motors so that the rate of feed and width of swath can be separately controlled.

In one modification of the apparatus, the hydraulic system which supplies pressure fluid to the auger and slinger motors is carried by the supply tank. The flow of pressure fluid to the motors is controlled remotely from the helicopter through an electrical switch which operates a solenoid valve in the hydraulic circuit incorporating the slinger and auger motors. In a second modfication of the apparatus, pressure fluid is supplied to the auger and slinger motors beneath the tank through flexible hydraulic supply and return lines extending to power takeoff connections in conjunction with a pressure source on the helicopter.

---

This application is a continuation of application Ser. No. 632,696, filed Apr. 21, 1967, now abandoned.

BACKGROUND OF THE INVENTION

Field of the invention

The present invention relates to material spreading devices for aircraft and more particularly to a granular material spreading apparatus for helicopters.

Description of the prior art

A continuing problem in the adaptation of any helicopter for use in spreading fertilizers, pesticides, herbicides and other bulk materials is the difficulty in maintaining the spreading apparatus, including the material supply tanks, in balance with respect to the helicopter's center of gravity, so as to prevent uncontrolled pitch and roll of the helicopter in flight. This problem has given rise to the use of dual material supply tanks in prior spreading devices for helicopters, one attached to each of the opposite sides of the helicopter body. In such dual supply tank systems, however, it is absolutely essential that means be provided for equalizing the material flow rates from the two tanks to the spreading device so that the helicopter is maintained in balance throughout the spreading operation. Spreading apparatus for helicopters incorporating such dual tank systems are shown, for example in United States Patents 2,597,323, 2,680,648 and 3,204, 896.

Although dual supply tank spreading systems, in general, operate quite satisfactorily so long as there is no malfunction of their flow rate equalizing means, such systems have several inherent disadvantages. First, if there should be a malfunction of the flow rate equalizing means, or if an imbalance is otherwise created in flight, there is no means provided for rapidly jettisoning the tanks or the appurtenant spreading apparatus. Second, the fact that the tanks are mounted directly to the helicopter body creates a sanitation problem in that material from the tanks and spreading apparatus tends to accumulate in and on the helicopter and its operating mechanisms, particularly during the course of filling the tanks and during the spreading operation. Third, mounting and dismounting the tanks and appurtenant spreading apparatus from the helicopter is a lengthy operation. Fourth, refilling the tanks takes a long time since the helicopter must be landed and its rotor shut down to gain access to the tanks.

SUMMARY OF THE INVENTION

In accordance with the present invention, the problems mentioned above with respect to the prior art are overcome by providing a spreading apparatus having a single supply tank slung by cables from the cargo hook of the helicopter, with the supply tank itself carrying a slinger device and means for feeding material from the tank to the slinger. More specifically, the use of a single, suspended tank provides an alternative and more fool proof solution to the problem of maintaining balance than the prior dual tank approach since the need for flow rate equalizing means in the former is entirely eliminated.

The suspended tank and spreading apparatus is also considerably cleaner than the prior art dual tank system in that the suspended apparatus is below the helicopter body and far removed from its operating mechanisms. Cleanliness is further promoted by the fact that tanks can be preloaded on the ground while the helicopter is engaged in a spreading operation elsewhere, because the tanks can be quickly and easily connected to and disconnected from the helicopter's cargo hook. This feature also reduces reloading time to a minimum and, in fact, an empty tank can be replaced with a full one while the helicopter hovers just above the ground. Suspension of the tank and appurtenant spreading apparatus from the helicopter's cargo hook also has advantages of safety over the prior dual tank approach in that the tank can be quickly jettisoned, if necessary, while the helicopter is in flight using the helicopter's standard jettisoning mechanism associated with its cargo hook.

From the foregoing it will be apparent that the principal objects of the present invention are to provide a spreading apparatus for helicopters that:

(1) Creates no imbalance in the helicopter carrying the same;
(2) Will not soil the helicopter or its operating mechanisms;
(3) Minimizes loading time;
(4) Minimizes installation and removal time;
(5) Is safe and easy to use;
(6) Eliminates costly, complex and malfunction-prone flow rate equalizing means of prior dual tank systems; and
(7) Provides relatively maintenance free operation;
(8) Provides independent control of rate of feed and the width of the swath over which spreading takes place.

BRIEF DESCRIPTION OF THE DRAWINGS

The foregoing and other objects and advantages of the present invention will become more apparent from the following detailed description which proceeds with reference to the accompanying drawings wherein:

FIG. 1 is a side view of a helicopter equipped with a material spreading apparatus in accordance with the present invention;

FIG. 2 is a side view of the spreading apparatus of FIG. 1 on a greatly enlarged scale;

FIG. 3 is a front end view of the spreading apparatus on the same scale as FIG. 2;

FIG. 4 is a top view of a major portion of the spreading apparatus taken along the line 4—4 of FIG. 2 on a slightly smaller scale than FIG. 2 and with an upper portion of the apparatus broken away for clarity of illustration;

FIG. 10 is a fragmentary side view of a modified form of spreading apparatus in accordance with the invention;

FIG. 11 is a hydraulic flow and control diagram for the spreading apparatus of FIG. 1; and FIG. 12 is a hydraulic flow and control diagram for the spreading apparatus of FIG. 10.

DETAILED DESCRIPTION

FIG. 1 Embodiment, in general

Figure 5:
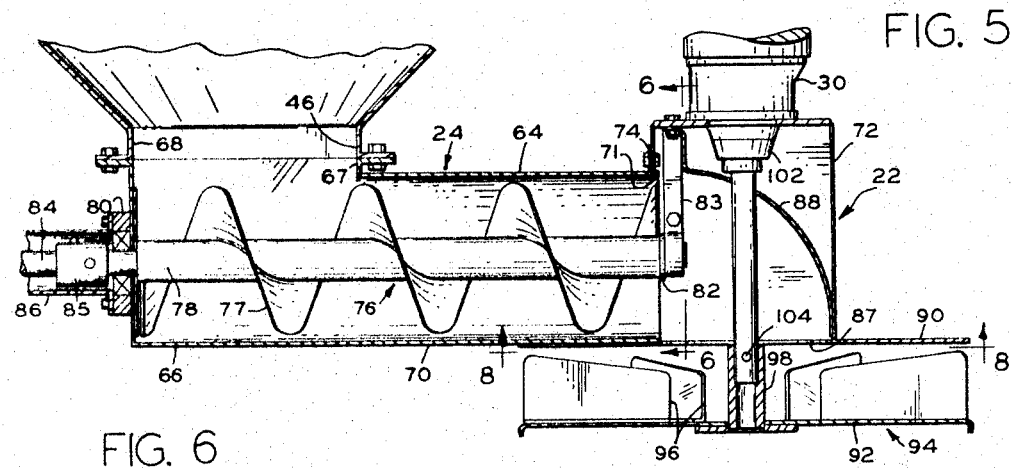
FIG. 5 is a vertical mid-sectional view through a lower portion of the tank, auger housing and slinger of the spreading apparatus on a slightly larger scale than FIG. 2.
Figure 6:
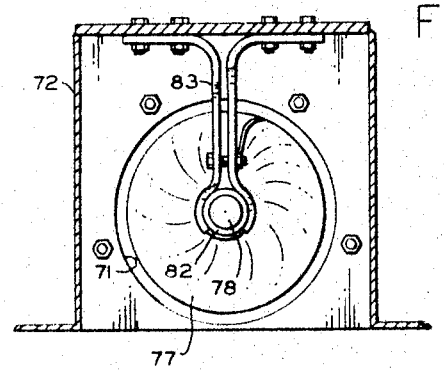
FIG. 6 is a vertical sectional view taken along the line 6—6 of FIG. 5 on a slightly larger scale than FIG. 5.
Figure 8:
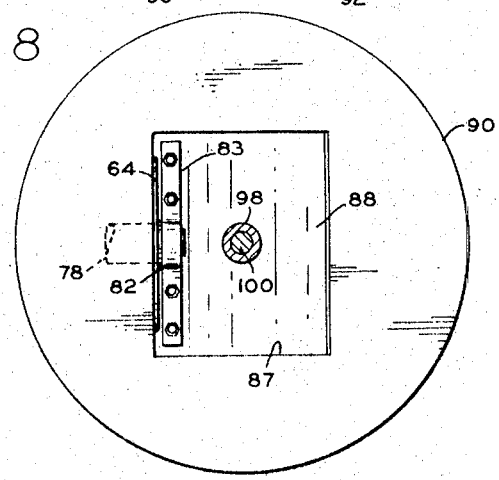
FIG. 8 is a horizontal sectional view taken along the line 8—8 of FIG. 5 on the same scale as FIG. 5.
Figure 7:
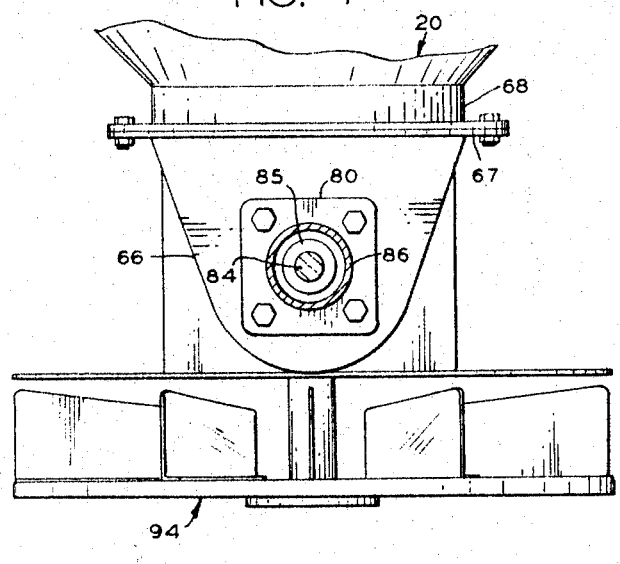
FIG. 7 is a vertical sectional view taken along the line 7—7 of FIG. 2 on approximately the same scale as FIG. 6.

With reference to the drawings, FIG. 1 shows a helicopter 10 having a body 12 including a cockpit 14 and the usual cargo hook 16 depending from the underside of the body. As is common in helicopters equipped with cargo hooks, the hook includes a jettison mechanism (not shown) operable from the cockpit which when actuated tilts the hook to a position in which it will release a load suspended therefrom.

Attached to the hook is a cable-type sling suspension means 18 which suspends a supply tank 20 containing a granular material such as a fertilizer, pesticide, herbicide or the like. The tank carries at its lower end a material spreading slinger means indicated generally at 22 and an auger-type feeder means 24 which conveys material at a desired rate from a bottom opening in the tank rearwardly to the slinger means. The auger and slinger are independently driven by separate drive means 28, 30, respectively, which are hydraulically powered from a fluid pressure system 32, carried by the supply tank, but controlled by remote means from the cockpit of the helicopter.

Supply tank

Referring to the more detailed views of FIGS. 2, 3 and 4, the supply tank is composed of two frusto-conical shell sections, including an upper section 36 and a lower section 38, with the lower section being inverted with respect to the upper section and having a substantially greater depth than the latter. The shell sections are bolted together along mating flanged edges 40, 41 of each intermediate the top and bottom of the tank. The tank includes a large filler opening 42, which is normally closed during the spreading operation by a lid 44 held in place by clamps 45, and a smaller bottom opening 46 (FIGS. 4 and 5). The shell sections may be made of any strong, lightweight material such as fiberglass. Each shell section has a pair of laterally opposed vertically extending transparent strips 48, 49 which permit visual inspection of the level of the contents within the tank from either above, below or beside the tank at any time.

Three vertical support legs 50 are fastened at their upper ends to the flanged midsection of the tank at equally spaced apart positions therealong and extend downwardly below the tank and its appurtenant feeding and spreading components to support the same in an upright position when lowered to the ground surface. Cross braces 51 extend from each of the two rear legs 50 to the bottom of the tank to stabilize such legs.

Cable type suspension means

Figure 9:
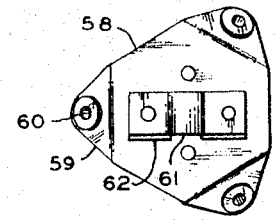
FIG. 9 is a plan view of the load lifting bracket as viewed from the line 9—9 of FIG. 2 on a much larger scale than FIG. 2.

The suspension means includes three suspension cables 52, 53 and 54 which extend upwardly and inwardly from tank gripping anchors 55 bolted to the underside of flanged edge 41 of the lower tank section at equally spaced apart locations along such flange, to clevis connections 56 attaching the cables to a common lifting bracket 58. As shown in FIG. 9, the lifting bracket is a generally triangular plate-like member having downturned corners 59 with openings 60 therethrough for receiving the clevis connections 56. At the center of the upper surface of the lifting bracket an eye forming member 61 reinforced by gussets 62 receives cargo hook 14 of the helicopter. Thus it will be evident that the entire spreading apparatus, including the supply tank and its appurtenances, is suspended by the single lifting bracket 58 from the cargo hook, and thus can be jettisoned easily from the helicopter in the event of an emergency in flight. Since the cargo hook is positioned directly below the center of gravity of the helicopter and in alignment with the rotor axis, no unbalancing of the helicopter is possible.

Feeder and spreader means

With reference especially to FIGS. 2 and 5, the auger-type feeder means 24 and slinger means 22 are particularly adapted for spreading granular materials. To this end, the feeder means includes an auger housing 64 having an upwardly opening material receiving front portion 66 with a flanged upper extension 67 bolted to a similar lower extension 68 of the supply tank surrounding bottom tank opening 46. The auger housing also includes a tubular rear portion 70 extending rearwardly from the material receiving portion to a sidewall inlet opening 71 of a rectangular receiving chamber 72 of the slinger. A flanged rear end portion 74 of the auger housing surrounding the rear opening thereof is bolted to the receiving chamber.

An auger 76 including a continuous blade 77 and shaft 78 extends within the auger housing with the blade terminating at the opposite ends of the housing. The opposite ends of the auger shaft extend through the opposite ends of the housing and are journaled in bearings, including a bearing structure 80 on the outside front end wall 81 of the auger housing and another bearing 82 suspended by a hanger bracket 83 from the inner top wall of the receiving chamber just inside its inlet opening.

The forward end of auger shaft 78 is connected to a drive shaft 84 of a hydraulic powered, high torque orbital motor 28 (FIG. 2) comprising the auger drive means, by a sleeve coupling 85. The coupling and drive shaft are surrounded by a housing tube 86 extending between the motor and the bearing structure 80.

The receiving chamber has a rectangular bottom opening 87 and a curved interior partition 88 extending from an upper portion of its front wall to a lower portion of its rear wall so as to direct material fed into the chamber through such bottom opening. A disc 90 extends horizontally from the lower end of the receiving chamber and surrounds its bottom opening. This disc is in vertical alignment with and spaced above a disc portion 92 of a spinner member 94. The upper surface of spinner disc 92 mounts a series of upstanding slinger vanes 96 which extend radially from a central portion of the disc. A sleeve member 98 extends upwardly from the center of spinner disc 92 and receives a vertical spinner shaft 100 which extends upwardly through the receiving chamber and which is journaled in a bearing member 102 at the upper end of the chamber above partition 88. The upper end of spinner shaft 100 is coupled to an output shaft (not shown) of a hydraulic powered high speed gear motor 30 mounted on the top wall of the chamber, such motor serving as the spinner drive means. The lower end of spinner shaft 100 is connected by a pin 104 to sleeve 98 of spinner disc 92 so that spinners of different diameters and thus having different slinging ranges can be connected to the shaft, depending on the requirements of a given job.

Spinner disc 92 is centered below bottom opening 86 of the receiving chamber so that material drops from the chamber onto the center of the disc, whereby the spinner will sling material horizontally throughout a full 360 degree area surrounding the same.

From the foregoing it will be apparent that the auger and spinner are driven independently of one another, the latter by a high speed gear motor and the former by a relatively low speed, high torque orbital motor. This arrangement permits the rate of feed from the tank and thus the density of the spread of material to be controlled independently of the speed of the spinner and thus the width of the swath laid down by the slinger. A high torque motor is required to turn the auger because of the direct unimpeded gravity flow of material from the tank into the receiving portion of the auger housing which keeps the housing filled with material at all times.

Hydraulic and control systems

Referring to FIGS. 2 and 3, the auger drive motor 28 and the spinner drive motor 30 are supplied with hydraulic fluid under pressure from a common self-contained hydraulic system 32 on the tank itself. More specifically, a horizontal support frame 112 is connected to front tank support leg 50 and suspended from the flanged rim of the tank by a pair of support arms 114, 115. Support frame 112 carries a pump and motor support base 116 to which a hydraulic pump 118 and a gasoline engine 120 for driving the pump are rigidly attached. A generally horizontally disposed cylindrical hydraulic fluid reservoir 122 extends between support arm 115 and front support leg 34 and is connected at its opposite ends to each by mounting brackets 123 and 124, respectively. Engine 120 carries its own fuel tank 126. The necessary hydraulic lines 128 extending from the pump and reservoir to the two motors include one supply line and one return line for each motor.

A suitable hydraulic system and control means for operating the motors is diagramed in FIG. 11. The foregoing described components of the hydraulic system including the pump, engine for driving the pump, and hydraulic powered motors for the spinner and auger are indicated in the diagram. The hydraulic lines 128 include a primary supply line 130 leading from the pump to the two hydraulic motors and a primary return line 132 leading from the hydraulic motors back to the reservoir 122. Normally, in operation motor 120 would be started before takeoff to drive pump 118. However, a two-position solenoid actuated directional flow valve 134 in line 130, with the solenoid de-energized, would direct the flow through a branch line 136 back to the reservoir upstream from and in parallel with the hydraulic motors to prevent their operation.

Solenoid valve 134 is energized by a remote switch 140 in the cockpit of the helicopter through an electrical conductor wire 142 extending between the switch in the cockpit and the solenoid valve on the tank. When the solenoid is energized, valve 134 directs fluid through a supply line 130a to a proportional flow divider 144, which directs a portion of the flow through a branch supply line 130b to spinner motor 30 and the remainder of the flow through branch supply line 130c to auger motor 28. Supply lines 130b and 130c contain variable flow restrictors 146, 148 respectively, which are preset prior to takeoff to regulate the speed of each of the two motors 28, 30.

A pressure relief valve 150 is placed in a line 151 short circuiting supply line 130 and return line 132 in parallel with the motors to divert a portion of the flow back to the reservoir 122 when pressure in the supply line 130 reaches a predetermined maximum. An unloading valve 152 is also placed across supply line 130 and return line 132 in parallel with relief valve 150. The unloading valve is set to divert fluid back to the reservoir only at a relatively high pressure as compared to the pressure which will divert flow through valve 150, such as in the event of stalling of the motors while solenoid valve 134 remains energized. It will be apparent that with a system as shown in FIG. 11, operation of the auger and spinner motors can be controlled from a single remote switch 140 in the helicopter, which, in effect, functions as a simple on-off switch for starting or stopping the flow of pressure fluid to the two motors.

FIG. 10 embodiment

FIG. 10 represents a modification of the apparatus as shown in FIG. 1 wherein a slinger 22a and auger-type feed means 24a identical to the corresponding components of the FIG. 1 embodiment are driven by hydraulic motors 30a and 28a respectively, which may be identical to the corresponding motors of the FIG. 1 embodiment. However, instead of the motors being driven by a hydraulic system which is self-contained on the tank itself, such motors receive hydraulic pressure fluid from a remote source on the helicopter through flexible supply and return hoses connected to power takeoff connections on the helicopter. These hoses include a primary supply hose 160, a primary return hose 162, branch supply hoses 160a and 160b leading, respectively, to the auger and spinner motors from a T coupling 161 on the primary hose 162, and branch return lines 162a and 162b leading from the same motors to a similar T coupling (not shown) on the primary return line.

A hydraulic system and control suitable for the modification of FIG. 10 is diagramed in FIG. 12, wherein the spinner and auger motors and supply and return lines are also indicated. The system includes a variable displacement pressure compensated pump 164 and reservoir 166 on the helicopter, together with power takeoff connections 167, 168, also on the helicopter, for the supply and return lines 160, 162, respectively. A hydraulic line between the output side of pump 164 and power takeoff connection 167 includes a manually operable shutoff valve 170 for controlling the flow of pressure fluid to the spinner and auger motors. When valve 170 is opened, pressure fluid flows from pump 164 through primary supply line 160 to branch lines 160a and 160b and thence through variable flow regulators 172 and 174 in such branch lines and finally to the motors 28a, 30a. The exhausted fluid returns to reservoir 166 through return lines 162a, 162b and primary return line 162.

Referring again to FIG. 10, support legs 50a for the tank 20a are stabilized by cross braces 176 extending between the three legs. This sort of bracing is not provided in the FIG. 1 embodiment because of the obstruction presented by the hydraulic equipment carried by the tank in such embodiment. However, bracing of the front leg of the FIG. 1 embodiment is not required because stability is provided by the support frame 112 and arms 114, 115 of the hydraulic equipment, as shown in FIG. 2.

Except for the above noted differences, the components of the spreading apparatus of FIG. 10 are identical to the corresponding components of the FIG. 1 embodiment.

Operation

Referring again to the embodiment of FIG. 1, in operation tank 20, preferably while removed from the helicopter, is filled with the desired granular material through its top opening. With the tank filled, engine 120 is started with solenoid valve 134 de-energized so that the auger and slinger motors do not operate. Variable flow regulators 146 and 148 are preset so that the auger spinner will be rotated at their desired speeds. Then, with the helicopter hovering just above the ground surface, lifting bracket 58 is connected to the helicopter's cargo hook, after which the helicopter proceeds to the spreading site with the tank and spreading components suspended beneath it. It has been found that maximum control is achieved with the tank suspended just beneath the helicopter body as shown in FIG. 1.

When the helicopter reaches its destination, the spreading operation is commenced by operating remote control switch 140 to energize solenoid valve 134, which then directs the flow of pressure fluid to the spinner and auger motors. With such motors operating at their preset speeds, the material flows by gravity from the tank into the auger housing, where the auger feeds it rearwardly into the receiving chamber. Upon reaching such chamber, the material falls through its bottom opening onto the rotating spinner disc, from which the material is broadcast horizontally in a 360 degree arc beneath the helicopter and tank.

During the spreading operation, the helicopter pilot can determine the level of granular material remaining in the tank at any time simply by visual inspection through the transparent strips 48 of the upper shell. When the tank is empty, the helicopter returns to a reloading site, descends to a level at which legs 50 support the tank on the ground surface and releases the suspension cable from the cargo hook by means of the jettison mechanism. Then while still hovering, the helicopter moves over to a waiting prefilled tank, and the lifting bracket of such tank is connected to the cargo hook of the helicopter to complete the reloading operation.

Having illustrated two different embodiments of the invention, it should be apparent to those having ordinary skill in the art that the same permits of modification in arrangement and detail.

We claim:

1. A material spreader apparatus for a helicopter having a body with a cargo hook depending from the underside thereof, said apparatus comprising:

a supply tank having a bottom opening, spreader means carried by said tank in communication with said bottom opening for receiving material from with said tank through said bottom opening, suspension means, including first connecting means at one end of said suspension means for connecting said suspension means to said tank and second connecting means at the opposite end of said suspension means for releasably connecting said suspension means and thus said tank to the cargo hook of a helicopter, and spreader drive means operable while said tank and spreader means are suspended beneath said helicopter by said suspension means, said tank including supporting legs extending downwardly to a level below said bottom opening and below said spreader means so that said tank is self-supporting in an upright position on a generally horizontal supporting surface independently of said helicopter.

2. A material spreader apparatus for a helicopter having a body with a cargo hook depending from the underside thereof, said apparatus comprising:

a supply tank having a bottom opening, spreader means carried by said tank in communication with said bottom opening for receiving material from with said tank through said bottom opening, suspension means connected to said tank including means for connecting said suspension means to the cargo hook of a helicopter to suspend said tank below said helicopter, and power operated drive means operable while said tank and spreader means are suspended beneath said helicopter by said suspension means, and means under control of the operator of the helicopter to stop and start said drive means, said tank including supporting legs extending downwardly to a level below said bottom opening and below said spreader means so that said tank is self-supporting in an upright position on a generally horizontal supporting surface independently of said helicopter.

3. A material spreader apparatus for a helicopter having a body with a cargo hook depending from the underside thereof, said apparatus comprising:

a supply tank having a bottom opening, spreader means carried by said tank in communication with said bottom opening for receiving material from with said tank through said bottom opening, cable type suspension means, including first connecting means at one end of said suspension means for connecting said suspension means to said tank and second connecting means at the opposite end of said suspension means for releasably connecting said suspension means and thus said tank to the cargo hook of a helicopter, and spreader drive means operable while said tank and spreader means are suspended beneath said helicopter by said cable suspension means, said tank including supporting legs extending vertically to a level below said bottom opening and below said spreader means so that said tank is self-supporting in an upright position on a generally horizontal supporting surface independently of said helicopter.

4. Apparatus according to claim 3 including auger means for feeding material from said tank to said spreader means interposed between said bottom opening and said spreader means.

5. Apparatus according to claim 4 including separate variable speed means for driving said auger means and said spreader means concurrently, including control means for controlling independently the speeds of said auger means and spreader means.

6. Apparatus according to claim 4 wherein, said apparatus is adapted for spreading granular material in that said auger means delivers said material to spreader means comprising a generally horizontally oriented slinger means at the outfeed end of said auger means.

7. Apparatus according to claim 6 including first variable speed drive means for driving said auger means and second variable speed drive means for driving said slinger means independently of said auger means, and speed control means permitting simultaneous operation of said slinger means and auger means at different speeds so that the rate of feed of material from said tank to said slinger means and the speed of rotation of said slinger means can be controlled independently of one another for controlling the width and density of the swath independently of one another.

8. Apparatus according to claim 7 including control means operable from said helicopter for controlling the starting and stopping of said first and second drive means.

9. Apparatus according to claim 7 wherein said first and second drive means are fluid pressure actuated from a common source of pressure fluid and said source of pressure fluid and a prime mover therefor are carried by said supply tank and wherein a remote control means operable from said helicopter controls the flow of pressure fluid from said source to said first and second drive means.

10. A material spreader apparatus for a helicopter having a body with a cargo hook depending from the underside thereof, said apparatus comprising:

a supply tank having a bottom opening, spreader means carried by said tank in communication with said bottom opening for receiving material from within with said tank through said bottom opening, cable type suspension means, including first connecting means at one end of said suspension means for connecting said suspension means to said tank and second connecting means at the opposite end of said suspension means for releasably connecting said suspension means and thus said tank to the cargo hook of a helicopter, spreader drive means operable while said tank and spreader means are suspended beneath said helicopter by said cable suspension means, auger means for feeding material from said tank to said spreader means interposed between said bottom opening and said spreader means, said apparatus being adapted for spreading granular material in that said auger means delivers said material to said spreader means and said spreader means comprises a generally horizontally oriented slinger means at the outfeed end of said auger means, said auger means including an auger housing beneath said tank having an upwardly opening material receiving portion vertically beneath the bottom opening of said tank with means connecting said material portion to said tank and a tubular portion extending horizontally in the direction of the longitudinal axis of said helicopter from said receiving portion toward said slinger means, an auger including an auger shaft extending within said tubular portion and said receiving portion and rotatably mounted at the opposite ends of said auger housing, said slinger means including a receiving chamber connected to the outfeed end of said tubular portion and having a sidewall inlet opening through which material is received from said auger, and a bottom opening, a slinger member including a rotatable disc spaced beneath said chamber and upstanding vanes extending upwardly from and radially on said disc, a vertical shaft means rotatably mounting said slinger disc at the lower end thereof and extending upwardly through said receiving chamber to a slinger drive means mounted on top of said receiving chamber, said slinger disc and said vanes being centered beneath the bottom opening of said receiving chamber so that granular material will be fed onto the central portion of said disc and slung outwardly by said vanes throughout a full 360 degrees dispersion circle.

11. Apparatus according to claim 10 including a bearing hanger means connected to an upper inner wall portion of said receiving chamber and suspending a bearing means at said inlet opening of said receiving chamber, said bearing means rotatably mounting one end of said auger shaft, said receiving chamber including curved wall for directing material received from said auger downwardly through said bottom opening and onto a central portion of slinger disc, and second bearing means at an upper portion of said receiving chamber above said curved wall means mounting said vertical slinger shaft.

12. A material spreader apparatus for a helicopter having a body with a cargo hook depending from the underside thereof, said apparatus comprising:

a supply tank having a bottom opening, spreader means carried by said tank in communication with said bottom opening for receiving material from within said tank through said bottom opening, cable type suspension means, including first connecting means at one end of said suspension means for connecting said suspension means to said tank and second connecting means at the opposite end of said suspension means for releasably connecting said suspension means and thus said tank to the cargo hook of a helicopter, spreader drive means operable while said tank and spreader means are suspended beneath said helicopter by said cable suspension means, auger means for feeding material from said tank to said spreader means interposed between said bottom opening and said spreader means, said apparatus being adapted for spreading granular material in that said auger means delivers said material to said spreader means and said spreader means comprises a generally horizontally oriented slinger means at the outfeed end of said auger means, said apparatus also including upper and lower shell sections of frusto-conical shape, said lower shell section being inverted with respect to said upper shell section, said shell sections being joined together along flanged mating edges intermediate the upper and lower ends of said tank, said upper shell section including a filler opening and a removable lid for said filler opening at the upper end of said tank, the depth of said lower shell section being greater than the depth of said upper shell section, said shell sections including a vertically extending transparent portion for visibly determining the level of material within said tank, and said suspension means being adapted for connection to said flanged mating edges of said shell sections.

13. Apparatus according to claim 10, wherein the upwardly opening material receiving portion of said auger housing and the connected bottom opening of said tank provide an unimpeded gravity flow of material from said tank into the receiving portion of said auger housing and wherein said first drive means for said auger comprises a hydraulic actuated high torque motor so that the rate of flow of material from said tank to said slinger means is controlled solely by the speed of rotation of said auger.

14. A granular material spreading apparatus for a helicopter comprising:

a supply tank having a top filler opening, a bottom dispenser opening, and means for supporting said tank in an upright position on a supporting surface independently of said helicopter, cable suspension means including at least three lifting cables having upper and lower ends, means connecting the lower ends of said cables to said tank at spaced apart positions thereon and a lifting bracket attached to the upper ends of said cables and including means on said bracket defining an eye for receiving a cargo hook of a helicopter, material feeding means including an auger housing connected to a lower portion of said tank and having an infeed opening in communication with the bottom opening of said tank, said auger housing extending rearwardly beneath said tank from said bottom opening to an outfeed opening, an auger within said housing including an auger shaft extending forwardly of said housing and auger drive means connected to said shaft for rotating said auger, slinger means, including a receiving chamber connected to a rear end portion of said auger housing for receiving material fed rearwardly from said tank by said auger, and a spinner beneath said receiving chamber including a generally horizontally disposed spinner disc, spinner vanes on said disc and a spinner shaft extending upwardly from said disc through said receiving chamber and connected to a spinner drive means mounted atop said receiving chamber, said receiving chamber having a bottom opening centered above said spinner disc and means directing material fed into said chamber through said bottom opening so that said spinner will broadcast said material throughout a 360 degree area therefrom.

15. A granular material spreading apparatus for an aircraft, comprising:

a supply tank carried by said aircraft and having a bottom dispenser opening for said material, material feeding means including an auger housing connected to the lower portion of said tank and having an inlet opening at one end thereof in communication with said bottom opening of said tank, said auger housing extending generally in the direction of the longitudinal axis of said aircraft and having an outlet opening at its other end, an auger positioned within said housing and supported for rotation therein, drive means for rotating said auger to cause feeding of granular material from said inlet opening to said outlet opening so as to discharge said material through said outlet opening including auger speed control means to control the rate of rotation of said auger to control the rate of feeding of said material, a slinger positioned below said housing in position to receive material discharged through said outlet opening and including a generally horizontally disposed spinner disc supported for rotation about a generally vertical axis and having spinner vanes extending upwardly from said disc, drive means for rotating said spinner while said auger is rotating to cause said spinner to spread said material laterally of said aircraft to provide a swath of said material deposited below said aircraft including spinner speed control means to control the rate of rotation of said spinner independently of the rate of rotation of said auger to thereby control the width of said swath independently of said rate of feeding, said spinner and auger speed control means being operable to provide rotation of said auger and said spinner at different speeds at the same time, and means under control of the operator of said aircraft to stop and start said drive means for said auger and for said spinner.

16. Apparatus according to claim 15 in which each of said drive means comprises a hydraulic motor and means to control the supply of hydraulic fluid thereto and in which a hydraulic pump and power drive therefor is carried by said aircraft.

17. Apparatus according to claim 15 wherein each of said drive means comprises a variable speed hydraulic motor mounted beneath the fuselage portion of said aircraft, means to control the supply of hydraulic fluid to said hydraulic motors, and hydraulic pump and power drive means therefor carried by said aircraft.

References Cited

UNITED STATES PATENTS

| 2,659,556 | 11/1953 | Doblhoff | 239—171 |
| 2,898,008 | 8/1059 | Hillwik et al. | 239—684 X |
| 3,127,133 | 3/1964 | Glatfelter et al. | 244—137 X |
| 3,142,490 | 7/1964 | Tift et al. | 239—684 X |
| 3,167,319 | 1/1965 | Kerr | 239—684 X |
| 3,191,944 | 6/1965 | Watts | 239—684 |
| 3,341,125 | 9/1967 | Sweeney et al. | 239—171 X |

FOREIGN PATENTS

| 1,091,674 | 11/1967 | Great Britain. |

ROBERT B. REEVES, Primary Examiner

H. S. LANE, Assistant Examiner

U.S. Cl. X.R.

222—334; 239—675, 684